Aug. 22, 1967  W. C. SCHULTZ  3,336,734
FUEL VAPORIZING ASSEMBLY
Filed May 18, 1965  2 Sheets-Sheet 1

INVENTOR
WILDERICH C. SCHULTZ
BY
Keith D. Beecher

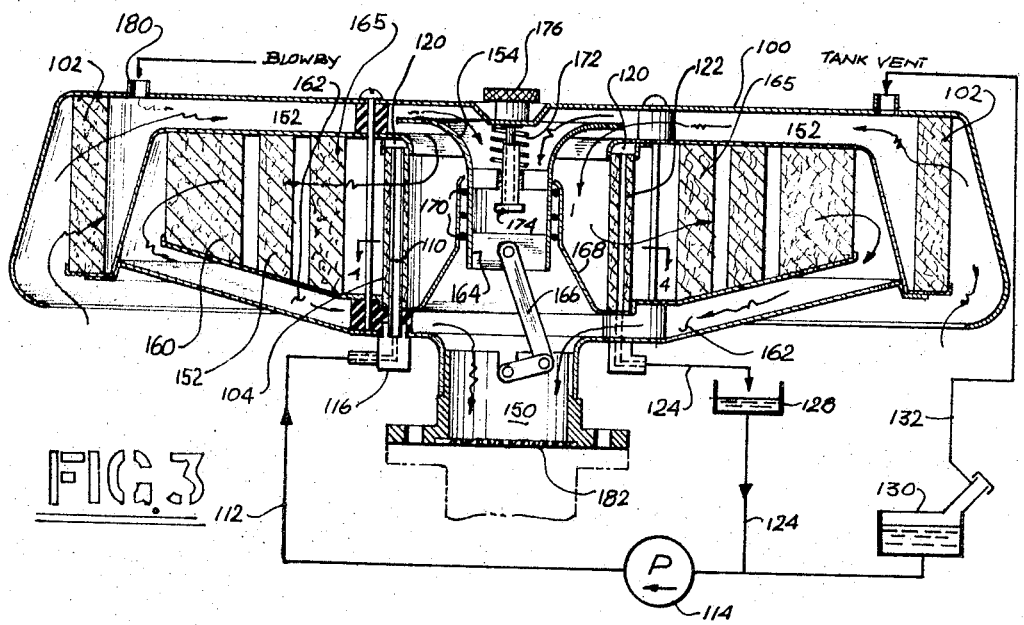

United States Patent Office 3,336,734
Patented Aug. 22, 1967

3,336,734
FUEL VAPORIZING ASSEMBLY
Wilderich C. Schultz, San Diego, Calif., assignor to
Schultz Converter Co., La Jolla, Calif., a partnership
Filed May 18, 1965, Ser. No. 456,686
4 Claims. (Cl. 55—258)

The present invention relates to fuel vaporizing assemblies for use in motor vehicles, or in conjunction with other fuel consuming devices, such as furnaces, or the like, which are adapted to draw an air/fuel mixture into the intake thereof for combustion purposes.

The invention is more particularly concerned with an improved fuel vaporizing assembly which is capable of mixing liquid fuel with air, and of vaporizing the liquid fuel into a dry vapor state; so that the introduction of wet fuel into the intake of the fuel consuming device is completely obviated.

The fuel vaporizing assembly of the invention will be described in conjunction with an internal combustion engine of a motor vehicle. It will become evident as the description proceeds, however, that the assembly finds general utility whenever a dry vapor is required for combustion, or other purposes.

It is most desirable that the fuel introduced to an internal combustion engine be in a completely dry vapor state. Otherwise, harmful sludges and varnishes will form in the engine. Moreover, incomplete combustion of the fuel will result.

The introduction of wet fuel into the engine, therefore, is wasteful since the wet fuel is not completely burned. Moreover, the discharge of the fuel from the engine creates contaminated air conditions in the surrounding atmosphere.

An object of the present invention is to provide an improved fuel vaporizing assembly for use with internal combustion engines, and with other fuel-consuming instrumentalities, and which is constructed so that the fuel fed to the engine is so fed in a dry vaporized state for complete consumption in the engine.

Another object of the invention is to provide such an improved fuel vaporizing assembly which, when used in conjunction with internal combustion engines, for example, will supply a properly metered mixture of air and dry fuel vapor at all operating speeds of the engine.

Another object of the invention is to provide such an improved fuel vaporizing assembly which is eminently simple in its operation, and which uses inexpensive and readily accessible components, so as to be inexpensive in its construction.

Yet another object of the invention is to provide such an improved fuel vaporizing assembly which may be easily installed in existing motor vehicles.

The fuel vaporizing assembly of the invention may replace the carburetor of a usual motor vehicle, for example. The assembly includes a fuel-absorbing element which exhibits a desired capillary action for the liquid fuel so as to absorb the fuel and to become saturated with it. This element is porous so that air may be drawn through it.

The resulting mixture emanating from the fuel-absorbing element is a rich fuel/air mixture. The mixture is then drawn through one or more filters, in the embodiments to be described. When so drawn, the liquid fuel particels tend to cling to the elements of the filters and to vaporize. The excess liquid fuel drains off the filters, and may be fed back to the fuel-absorbing element.

The resulting air/fuel mixture drawn into the intake of the associated fuel-consuming device includes dry fuel vapor, in which there are no liquid fuel particles. This mixture, when drawn into the fuel-consuming device results in complete and clean combustion therein.

Other objects, features and advantages of the invention will become apparent from a consideration of the following description, when the description is taken in conjunction with the accompanying drawings, in which:

FIGURE 3 is a side sectional view of a fuel vaporizing assembly representing one embodiment of the invention;

FIGURE 4 is a sectional view of the fuel-absorbing element of FIGURE 3, taken essentially along the line 4—4 of FIGURE 3;

FIGURE 5 is a cross-sectional view, like the view of FIGURE 4, and showing a modified construction for the fuel-absorbing element;

FIGURE 6 is a sectional view, taken along the line 6—6 of FIGURE 3; and

FIGURE 7 is a view like FIGURE 6, and showing a modification in the construction of the fuel-absorbing element.

Figure 1:
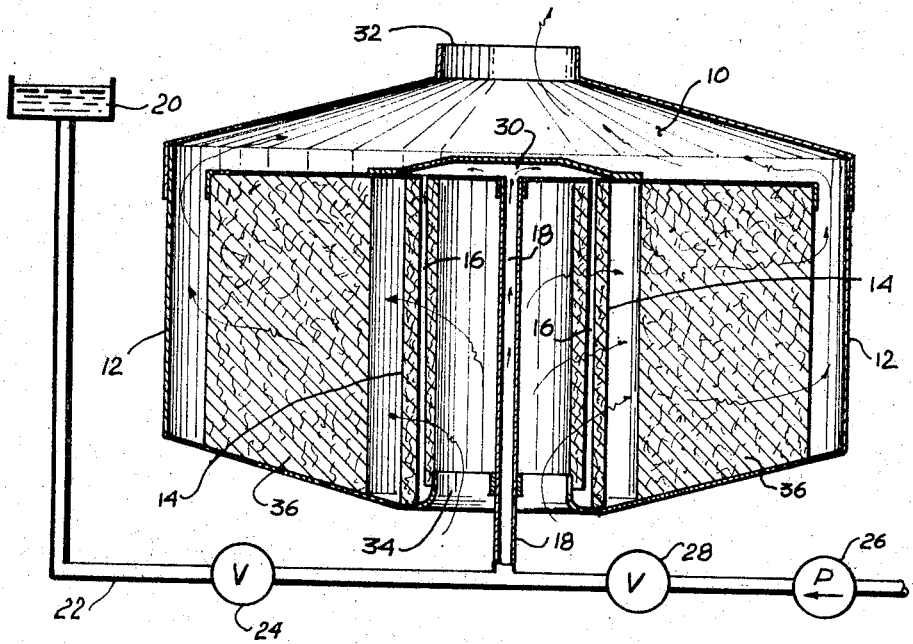
FIGURE 1 is a side sectional view of a fuel vaporizing assembly, shown in schematic form, and incorporating the concepts of the present invention.

In the embodiment of FIGURE 1, the fuel vaporizing assembly is indicated generally as 10. The assembly includes a generally cylindrical-shaped casing 12 which may, for example, be formed of an appropriate metal. The casing 12, as shown, has a sloping bottom, and it also has a sloping top.

A cylindrical-shaped fuel-absorbing element 14 is mounted in an upright position in the center of the casing 12. The element 14 may be formed, for example, of any appropriate spun or casted plastic or fiber material which exhibits a high capillary action to the fuel, and which also is porous.

A plurality of passageways 16 may extend longitudinally through the fuel-absorbing element 14, to aid in the passage of the liquid fuel through the element, so that the entire wall of the element may become saturated with the liquid fuel.

The liquid fuel is introduced to the passageways 16 of the fuel-absorbing element 14 through a central pipeline 18. The fuel may be supplied from a gravity tank 20, for example, through a line 22 and valve 24. Alternately, the fuel may be supplied from any appropriate source by means, for example, of a pump 26 and through a regulator control valve 28. The valve 28 may be controlled, for example, by means of a foot pedal, or other manually actuated throttle control.

In either event, the liquid fuel is caused to flow up through the pipeline 18 and into a manifold 30 at the top of the fuel-absorbing element 14. The fuel is then caused to flow from the manifold down through the passageways 16 to be absorbed by the fuel-absorbing element 14.

The fuel consuming device, such as an internal combustion engine is coupled to an outlet 32 in the top of the casing 12. This device draws air in through an intake port 34 at the bottom of the casing, the air being drawn radially through the wall of the fuel-absorbing element 14, as shown by the arrows. The resulting air/fuel mixture from the fuel-absorbing element 14 is then drawn through a filter element 36; the filter element being mounted in the casing 12 in concentric relationship with the fuel-absorbing element 14, and surrounding the element 14 in radially spaced relationship, as shown.

The air drawn radially through the fuel-absorbing element 14 becomes intermixed with fuel absorbed in the wall, so that a rich air/fuel mixture is produced. As this mixture is drawn radially through the filter 36, the liquid fuel particles are caused to cling to the elements making up the filter, so as to become vaporized. As a result, the air/fuel mixture emanating from the outer periphery of the filter 36 is completely vaporized.

Any residual liquid fuel flows down the slanting bottom of the casing 12 and back to the fuel-absorbing element 14, to be re-absorbed by that element.

The amount of fuel drawn into the associated fuel-consuming device, and the resulting speed of the device, when the fuel vaporizer is used in conjunction with an internal combustion engine, may be controlled by the regulator valve 28, or by the valve 24.

The fuel vaporizer assembly, as described above, provides that at all operating speeds of the internal combustion engine, for example, dry fully vaporized fuel only is drawn into the intake of the engine.

The filter 36 may be formed of a wire mesh, spun plastic or any other appropriate filter or strainer material. As mentioned above, the liquid particles of the fuel cling to the fibers of the filter, so as to "wet" the fibers and thereby evaporate. The evaporation of the fuel is assisted by the vacuum created in the assembly by the intake of the device with which the assembly is used.

Figure 2:
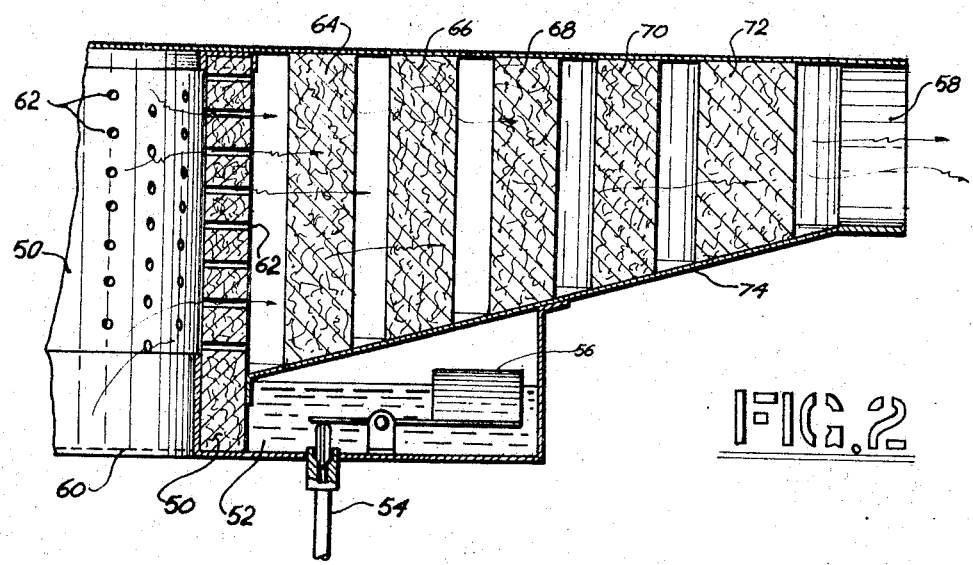
FIGURE 2 is a partial side sectional view, also in schematic form, of a modified form of the invention.

The fuel vaporizing assembly of FIGURE 2 is generally similar to the assembly of FIGURE 1. The latter assembly includes a cylindrical fuel vaporizing element 50. The fuel vaporizing element 50 extends down into a float chamber 52, and absorbs the fuel from the float chamber by means of capillary action.

The fuel is introduced to the float chamber through an intake 54, and a usual float mechanism 56 is provided to maintain a desired fuel level in the chamber.

Air is drawn through the assembly of FIGURE 2 by the associated fuel-consuming device which is coupled to an outlet 58. The air so drawn is drawn up through an intake port 60 at the bottom of the assembly; and through air passages 62 which are provided in the porous fuel-absorbing element 50, so as to facilitate the passage of air through the element.

A plurality of concentric filters 64, 66, 68, 70 and 72 are provided in the assembly of FIGURE 2. These filters may have the same composition as the filter 36 of FIGURE 1. The filters 64, 66, 68, 70 and 72 are arranged in spaced, nested, concentric relationship with one another, and they surround the element 50. The degree of porosity of the filters may change from 30 pores per square inch, for example, for the inner filter 64, to 100 pores per square inch, for example, for the outer filter 72.

As in the embodiment of FIGURE 1, any residual liquid fuel is drained back down the sloping bottom of the casing 74, to be re-absorbed by the element 50.

As before, the mixture drawn through the porous fuel/absorbing element 50 is a rich mixture of fuel and air. This mixture is drawn through the successive filters 64, 66, 68, 70 and 72, and when it is drawn through the filters, all the fuel in the mixture is caused to evaporate, so that the mixture is in a dry vapor state, as is desired, when it is fed to the associated fuel-consuming device.

The embodiment of the invention shown in FIGURE 3 is similar in some respects to the embodiment of FIGURE 2. The latter embodiment includes a casing 100 which surrounds the entire assembly, air being drawn in through the bottom of the casing 100 and through a cylindrical air filter 102. The filter 102 may be of the same composition as the air filters in general use in conjunction with the carburetors of present-day motor vehicles, for example.

A cylindrical porous fuel-absorbing element 104 is mounted in the center of the casing 100 in an upright position. As shown in FIGURE 4, for example, the fuel absorbing element 104 has a series of passages 106 extending longitudinally through its wall. These passageways 106 permit the passage of fuel through the fuel-absorbing element, so that it may become completely saturated.

The inner wall of the fuel-absorbing element 104 has a series of protective shields 108 adjacent the individual passageways 106. These shields are impervious, so as to prevent fuel from being drawn radially directly from the passageways 106 out of the element. The shields cause the liquid fuel to permeate throughout the element 104, as is desired.

The liquid fuel is introduced into the wall of the element 104 through a pipeline 110. A line 112 from a pump 114 is coupled to the pipeline 110 through a coupling 116. The fuel passes up the pipeline 110 and into an annular manifold 120 formed at the top of the element 104, as shown in FIGURES 3 and 6. The fuel then passes down the passageways 106, so as to permeate the entire wall of the element 104 and to saturate the element.

The excess fuel is returned to the intake of the pump 114 through a pipeline 122, and through a line 124 coupled to the pipeline. The pipeline 122 has apertures therein, as shown in FIGURES 3 and 6, for example, so as to permit the excess fuel to enter the line and to be passed back to the pump. An aerator 128 is provided in the return line 124, so as to prevent the suction of the pump drawing the fuel back from the element 104.

The fuel is supplied from an appropriate tank 130, as shown. The tank may be vented to the interior of the casing 100 through a line 132.

The air is drawn through the assembly through a flanged outlet 150 which is coupled to the associated fuel-consuming device. It will be appreciated that when the associated fuel-consuming device exerts a vacuum on the assembly, the air is drawn in through the bottom of the assembly and through the air filter 102 into a chamber 152. As shown in FIGURE 3, the valve mechanism has a movable bell-shaped member 164 which has a lip extending across the peripheral edge of the top of the fuel absorbing element 104. The bell-shaped member 164 is movable between an open and a closed condition with respect to the top of the fuel absorbing element, so as to form a valve for air drawn into the interior of the element.

The air is drawn into the interior of the fuel-absorbing element 104, around the body portion of the bell-shaped movable member 164, when a valve mechanism 154 is open. The air is then drawn radially through the fuel-absorbing element 104; and the resulting air/fuel mixture is drawn through a series of filters 156, 158 and 160, which are the equivalent to the filters 64, 66, 68, 70 and 72 of the embodiment of FIGURE 2. The mixture then passes through a manifold 162 and through the outlet 150.

The bell-shaped movable central member 164 may be controlled, for example, by a crank arrangement 166 coupled to an appropriate throttle. The member 164 moves reciprocally as a piston in a cylindrical supporting bracket 168, the member being supported in the cylindrical bracket 168 by a plurality of O-rings 170. The O-rings 170 serve as seals for the movable piston member 164, and they also function as bearings, permitting the movable member 164 to move up and down in the bracket 168.

The movable piston member 164 has a flared upper portion which seats with the upper end of the element 104, when the valve 154 is in a fully closed condition. In the fully closed condition, no air is permitted to pass into the interior of the fuel-absorbing element 104, so that the flow of air through the assembly is arrested. It will be appreciated that the movement of the movable piston member 164 of the valve assembly 154 controls the amount of air flowing through the assembly, so as to control, for example, the speed (or rate of combustion) of the associated fuel consuming device.

The piston member 164 of the valve assembly 154 is spring loaded by means, for example, of a spring 172, so that the piston is normally biased to its closed condition. A stop 174 is provided, and this stop is adjustable manually by means, for example, of a knurled knob 176. The stop 174 prevents the valve 154 from becoming completely closed, so as to establish an adjustable idling condition for the assembly.

Blow-by fumes from the crankcase may be introduced to the assembly through an inlet port 180.

In the assembly of FIGURE 3, the fuel is pumped continuously through the assembly by the pump 114. A suitable valve, or other control, can be provided in the line 112 to control the flow of fuel through the assembly.

The mixture fed to the fuel consuming device is controlled by the valve 154 which, in turn, may be controlled by a foot pedal, for example, through the crank 166.

When the foot pedal is moved down, the movable member 164 of the valve 154 is moved up against the bias of the spring 172, so as to increase the amount of air drawn through the assembly. Conversely, when the pedal is released, the member 164 is moved down by the spring 172 to assume a nearly closed condition. The amount the valve is open during the nearly closed condition, can be established by adjustment of the knurled knob 176, to establish a desired idling condition.

A screen 182 may be provided across the outlet 150 which acts as a flame arrester. It should be noted that in the event of a backfire, the tendency is to move the valve 154 to a closed condition, so as to inhibit the backfire from reaching the actual fuel supply.

In the embodiment of FIGURE 5, the fuel-absorbing element 104′ is composed of two concentric components 104a and 104b. The component 104a, for example, has a series of longitudinal recesses 200 formed in it, which serve as passages for the fuel through the element. In the construction of the element 104′, the two sections 104a and 104b are mounted in telescopic relationship and are attached together by any suitable means. The recesses 200 are then formed into passageways, for the fuel. As before, the sides of the recesses may be suitably shielded, as at 202, so as to prevent the fuel from being drawn directly out of the passageways by the air streams.

The embodiment of FIGURE 7 shows a fuel-absorbing element 104″ which is essentially similar to the elements described above, but which includes passageways 206 for the air streams, which passageways extend in a radial direction. The latter element 104″ is composed of a material which is highly absorbent to the fuel, and which exhibits a high capillary action, so that passageways for the fuel are unnecessary. However, the latter material does exhibit a relatively high resistance to the air, so the passageways are provided for the air.

The invention provides, therefore, an improved assembly for vaporizing fuel. The improved assembly of the present invention is predicated on the principle of a fuel-absorbing element which, by capillary action, becomes saturated with the liquid fuel. Then, in accordance with the concepts of the invention, air is drawn through the element so that a resulting air/fuel mixture may be formed.

In order to remove all the liquid fuel from the mixture, it may be drawn through a series of filters, as explained above. The action of the device may be enhanced by preheating the air, before it is drawn through the assembly. This may be achieved by means of any appropriate heat exchanger means. However, the pre-heating of the air is not essential to the operation of the assembly, so that there is no problem in the initial starting up of the assembly.

It will be appreciated that while particular embodiments of the invention have been shown and described, modifications may be made. The following claims are intended to cover all modifications which fall within the scope of the invention.

What is claimed is:

1. A fuel vaporizing assembly including: a casing; a porous cylindrical shaped fuel absorbing element mounted in said casing and formed of a material exhibiting high capillary action to the fuel, said fuel absorbing element having a plurality of passages extending longitudinally through the wall thereof; means for introducing fuel into the longitudinal passages of said fuel absorbing element to permeate and saturate the wall of said element with fuel; at least one filter element mounted in said casing in concentric relationship with said fuel absorbing element and surrounding said fuel absorbing element; an outlet member mounted on said casing to be coupled to a fuel consuming device which exerts a vacuum within said casing and designed to cause air to be drawn into said casing and into the interior of said fuel absorbing element and then to be drawn radially through said fuel absorbing element to produce an air/fuel mixture which is drawn outwardly through said filter element and into said fuel consuming device.

2. The fuel vaporizing assembly defined in claim 1 in which said casing has an open bottom, and which includes a cylindrical shaped air filter mounted in said casing in concentric relationship with said fuel-absorbing element and in position so that air drawn into said casing through said open bottom thereof passes radially through said air filter and into the interior of said fuel-absorbing element.

3. The fuel vaporizing assembly defined in claim 1 in which said fuel introducing means causes said fuel to circulate through said fuel absorbing element and back to the source of the fuel.

4. The fuel vaporizing assembly defined in claim 1 and which includes a valve mechanism positioned in said fuel-absorbing element for controlling the flow of air into the interior of said fuel-absorbing element.

References Cited

UNITED STATES PATENTS

| | | | |
|---|---|---|---|
| 714,597 | 11/1902 | Mors | 123—133 |
| 993,516 | 4/1911 | Gentle | 261—107 |
| 1,171,566 | 2/1916 | Wolforsdorf | 261—97 X |
| 1,327,205 | 1/1920 | Heslewood | 261—99 |
| 1,820,512 | 8/1931 | Varvel | 55—259 X |
| 1,968,698 | 7/1934 | Meyer | 261—21 |
| 2,262,013 | 11/1941 | Lang | 55—258 X |
| 2,290,893 | 7/1942 | Phillips | 261—21 |
| 2,310,739 | 2/1943 | Lang | 261—21 |
| 2,323,721 | 7/1943 | McLindon | 261—107 X |
| 2,634,112 | 4/1953 | Snow | 261—97 X |

FOREIGN PATENTS

| | | |
|---|---|---|
| 231,275 | 4/1925 | Great Britain. |

HARRY B. THORNTON, *Primary Examiner.*

T. R. MILES, *Assistant Examiner.*